Nov. 22, 1932.  V. G. APPLE  1,888,613
APPARATUS FOR IMPREGNATING AND MOLDING A POROUS STRUCTURE
Filed Feb. 24, 1930
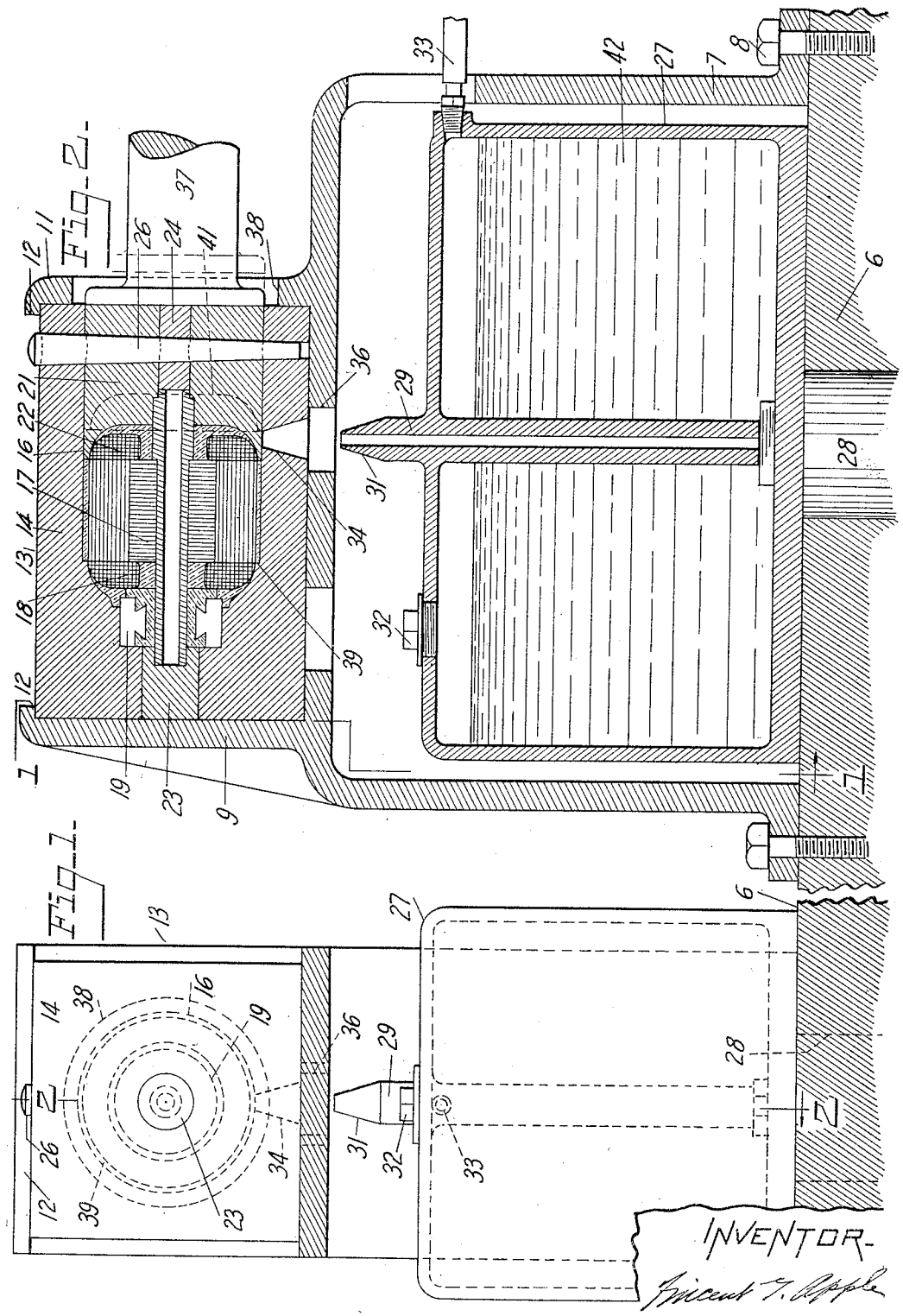
INVENTOR-
Vincent G. Apple Patented Nov. 22, 1932

1,888,613

UNITED STATES PATENT OFFICE

VINCENT G. APPLE, OF DAYTON, OHIO

APPARATUS FOR IMPREGNATING AND MOLDING A POROUS STRUCTURE

Application filed February 24, 1930. Serial No. 430,863.

This invention relates to apparatus for impregnating any porous article or structure with a fluid and molding it to shape, and is particularly applicable for impregnating and molding wound electrical elements with a fluid insulation.

The object of the invention is to provide apparatus wherein the porous article or structure may be closely surrounded by an envelope or mold, a fluid insulation injected by pressure through an opening in the mold and the opening closed in such a manner that no sprue remains to be removed from the impregnated article, to the end that all of the fluid may be usefully employed and a better and more finished article produced.

I attain this object by the apparatus hereinafter described, reference being had to the drawing wherein—

Fig. 1 is an end view of the apparatus.

Fig. 2 is a longitudinal vertical section taken at 2—2 of Fig. 1.

Similar numerals refer to similar parts throughout the several views.

As an illustrative embodiment of my invention I have selected apparatus adapted to impregnate and insulate a dynamo electric machine armature, the coils of which are composed of a plurality of turns of cotton covered magnet wire, or magnet wire covered with any similar absorptive material.

There is a class of molds within which articles are formed by filling the mold with a material in fluid state and solidifying it before removal therefrom, and such molds are necessarily separable to facilitate removal of the article molded. The gate in these molds through which the fluid enters the mold cavity is usually on the parting line of the mold, half of the gate often being in each half of the mold.

The portion of the fluid which remains in the gate and becomes solid along with the article molded is usually called the sprue, and being on the parting line of the mold, is removed from the mold along with the molded article, and must then be afterward cut off or otherwise removed from the article.

Such a conventional mold without modification is not readily applicable to the process of impregnation hereinafter described and to which my apparatus appertains, because the insulating material which I employ is preferably forced into the porous structure within the mold at an extremely high pressure, higher in fact than may be conveniently carried in any tank which might be provided to contain the supply of the liquid from which the mold could be filled; and further, because, if sufficiently high pressure could be carried in such a supply tank, and the mold were filled therefrom, the pressure in the mold would drop immediately when the mold was removed from the nozzle of the tank which is preferably done in order to put the mold in an oven to bake it. Nor could a satisfactory result be obtained if the mold and its contents were baked while the mold was still connected to the nozzle of the tank so as to maintain the pressure while baking, because in baking the contents of the mold the material in the nozzle of the tank would also be baked, and while such a result would be no great disadvantage where the hardened material in the nozzle could be again made fluid, as is the case in casting soft metals and the like, but in the case of many of the best insulating mediums, once they are hardened they may not again be made fluid, with the result that after the first article was so molded the nozzle would be permanently obstructed.

The necessity for special apparatus to attain the objects of my invention as set forth is then apparent. Such apparatus is shown in the drawing where the base 6 has the frame 7 secured thereto by screws 8. From the top of the frame 7 two end walls 9 and 11 extend vertically, the upper ends being turned inwardly as at 12. The mold 13 is slidably fitted between the end walls 9 and 11 and under the inturned ends 12. Mold 13 comprises a body 14 of square transverse section having a cylindrical opening 16 through its entire length, of a diameter equal to the armature core 17 at its larger end and progressively reduced in diameter to the other end, being cupped out intermediate the ends to correspond to the front winding head 18 and the commutator 19. Plunger 21 has its inner end cupped out to correspond to the back winding head 22. Knock out plugs 23 and 24 extend lengthwise through the bottoms of the cupped out parts, and wedge 26 passes transversely through a suitable opening to hold the several parts assembled as shown. When so assembled the entire mold may be moved crosswise of its axis from between end walls 9 and 11.

Normally resting on base 6 and under frame 7 is the supply tank 27. A ram 28 extending downwardly from the bottom of the tank into base 6 is adapted to raise and lower the tank by manipulation of a suitable valve (not shown). Or the tank may be raised and lowered by suitable manual means. A nozzle 29 extending upwardly from the top of the tank continues also nearly to the bottom within the tank. The upper end 31 of the nozzle is tapered as shown. A filler plug 32 may be removed to renew the supply of insulation within the tank, and a hose 33 is adapted to convey air or other gas under pressure from any convenient source into the space in the tank above the fluid insulation.

In the bottom wall of mold 13 is a tapered opening 34 corresponding to the tapered end 31 of nozzle 29. A clearance hole 36 in the top of frame 7 allows the nozzle 29 to pass through so that when tank 27 is raised by ram 28 the tapered end 31 enters the tapered opening 34, the tapers being so proportioned that the end of the taper 31 just reaches the cylindrical opening 16 of the mold. A horizontally disposed ram 37 operable from a cylinder, not shown, extends through an opening 38 in end wall 11, whereby end pressure may be applied to the plunger 21 by manipulation of any suitable valve.

In operation the armature is placed in the cylindrical opening 16 of mold body 14 with the core 17 resting against the shoulder 39 of the mold, as shown. The plunger 21 together with the knock out plug 24 are now inserted not fully, but only to such a depth as will bring the end of the plunger 21 to the broken line 41 whereupon the ram 37 is brought up far enough to hold them so located. Ram 28 is next manipulated to raise tank 27 so as to insert the tapered end 31 of nozzle 29 firmly into tapered opening 34. Compressed gas is now brought in through hose 33 into the top of tank 27 whereby the fluid insulation 42 is forced through nozzle 29 into the mold, impregnating the winding heads and filling the space between the end 41 of the partly inserted plunger 21 and the back head 22 of the winding.

The ram 37 is now brought forward the remainder of the way to press the plunger 21 to its final position, and, of course, part of the fluid between end 41 and head 22 is forced back into tank 27 while the plunger is moving across the upper end of the opening 34, but when the opening 34 is completely closed, further movement of plunger 21 toward the armature creates an intense pressure on the fluid, forcing it into the innermost recesses of the winding.

The intensity of this pressure is of course regulable by appropriately determining the longitudinal position of the core 17 relative to the opening 34. This is most conveniently done by changing the position of the shoulder 39 in relation to the opening 34.

After plunger 21 has been forced home by ram 37, and a wedge 26 has been inserted, the gas pressure in tank 27 is first relieved by operating a suitable by-pass valve, not shown, whereupon the fluid insulation in the upper end of nozzle 29 returns to the tank. The tank 27 is then lowered to its normal position, the ram 37 is withdrawn and the mold 13 is removed from between end walls 9 and 11 and placed in an oven to bake, and while it is intended that a separate oven be employed in connection with the apparatus shown, it is obvious that, if desired, heating elements may be built in the apparatus adjacent the mold, or included in the mold itself, whereby it may be baked in situ, and while in the apparatus shown it is intended that a fluid insulation be employed which will remain in a fluid state in the tank 27 at ordinary temperatures, if desired materials requiring moderate heat to keep them fluxed may be used in the tank by incorporating appropriate heating elements in, or adjacent to, one or more of the walls of the tank, and where the insulation is of such a nature as to afterward harden by merely permitting it to cool in the mold, all means for heating the mold may of course be eliminated.

When the mold 13 and its contents have been baked for a determined length of time, the wedge 26 is removed and the knock out plug 23 is pushed inwardly to discharge the completed armature together with the parts 21 and 24 from the body 14 of the mold. The armature is then removed from plunger 21 by means of the knock out plug 24, and an armature will have been produced which will not only have its coils thoroughly impregnated with the insulation but they will be hardened in a definite concentric shape so that the armature will have a better running balance. In addition to this the winding will be covered by the insulation so that no oil, moisture, or other foreign matter may penetrate it to its disadvantage. In actual practice of course a number of molds 13 are employed, all fitted to the one frame 7.

The importance of the particular construction of my apparatus will now be apparent when it is considered that the gate is not parted, thus providing a tapered opening to which a tapered filling nozzle may be quickly and securely connected by merely pressing it into place; that only a small fraction of the total pressure finally applied to the article is necessarily carried in the supply tank; that the same plunger which applies the ultimate pressure to the article which is being impregnated also acts as a valve to retain the material in the mold while it is being baked; and that all of this is accomplished without leaving any material in the nozzle, or in the gate where it would form a sprue which must be afterwards removed from the gate and cut from the article.

Having described one embodiment of my invention, I claim—

1. Molding apparatus comprising, a mold body containing a mold cavity of the contour of the article to be molded, a horizontal opening extending into said cavity from the end of the mold, and a vertical opening extending through the body into the horizontal opening from below, a horizontally movable plunger in said horizontal opening, the inner end of said plunger forming one end of said cavity, said plunger being of such length as to cover said vertical opening when fully inserted and to uncover it when partly withdrawn, a substantially closed supply receptacle containing the material to be molded, a vertically movable nozzle adapted to be inserted into said vertical opening to convey said material to said cavity to fill said cavity when said plunger is partly withdrawn, means to convey compressed gas into said receptacle to force said material through said nozzle into said cavity, and means to fully insert said plunger after said cavity is filled.

2. Molding apparatus comprising, in combination, a frame, a mold laterally insertable in said frame but held against vertical and endwise movement by said frame, said mold comprising a body containing a mold cavity of the contour of the article to be molded, a relatively large opening extending into said cavity from the end of the mold and a smaller opening extending transversely of and into the large opening, a plunger in said large opening, the inner end of said plunger forming one end of said cavity, said plunger being of such length as to cover said smaller opening when fully inserted and to uncover it when partly withdrawn, a substantially closed receptacle containing the material to be molded vertically movable in said frame below said mold, a nozzle extending upwardly from the top of said receptacle adapted to be inserted into said vertical opening to convey said material to said cavity to fill said cavity when said plunger is partly withdrawn, means to convey compressed gas into said receptacle to force said material through said nozzle into said cavity, and horizontally movable means to force said horizontally movable plunger to its fully inserted position.

3. For impregnating an absorptive structure with a fluid, a mold having an internal cavity of the form of the impregnated structure, means holding said absorptive structure positioned in said cavity, a relatively large opening extending into said cavity, a plunger slidably fitted to said opening, the inner end of said plunger being shaped to conform to the end of the impregnated structure, means to hold said plunger partly inserted in said opening with the inner end positioned apart from the end of said absorptive structure, a filler opening extending transversely of the said large opening into the said large opening between the end of said absorptive structure and the end of said plunger when said plunger is being held in said partly inserted position, means containing the impregnating fluid, means to fill the space between the end of said plunger and the end of said absorptive structure with said fluid, and means to force said plunger into said large opening over said filler opening to close said filler opening then farther toward the end of said absorptive structure to force said fluid into said absorptive structure.

4. Molding apparatus comprising, in combination, a mold body containing a mold cavity of the contour of the article to be molded, a plunger opening extending through said body into said cavity, a plunger slidably fitted to said plunger opening, the inner end of said plunger forming one end of said cavity, a filler opening extending transversely through said body into said plunger opening, said filler opening being positioned near the inner end of said plunger and covered by said plunger when said plunger is fully inserted, a supply receptacle containing the material to be molded, a nozzle connected to said supply receptacle and fitted to said filler opening to completely fill said filler opening when said nozzle is fully inserted, means to hold said plunger in a partly inserted position with said filler opening uncovered, means to hold said nozzle in a fully inserted position, means to force the said material in the supply receptacle through said nozzle and into the said cavity while the said nozzle is fully inserted, means to fully insert the said plunger to first close the said filler opening then to compress the said material, and means to withdraw the said nozzle away from the said filler opening after the said filler opening is closed and said material is compressed.

5. Apparatus such as is defined in claim 4 wherein the said nozzle is above the level of the liquid in the supply tank whereby the liquid left in the said nozzle after the said mold is filled may return to the said tank before the said nozzle is withdrawn from the said filler opening.

6. Apparatus such as is defined in claim 4 together with separate means to retain the said plunger in the fully inserted position after the said plunger is fully inserted and the said material is compressed.

7. Apparatus such as is defined in claim 4 together with a frame to rigidly support the said mold and the said nozzle while the said mold is being filled, means associated with the said mold to hold the said mold closed after it is filled, and means associated with the said frame to permit quick removal of the said mold from the said frame after the said mold is filled.

In testimony whereof I affix my signature.

VINCENT G. APPLE.